(12) United States Patent  (10) Patent No.: US 12,517,350 B2
Guo                       (45) Date of Patent: Jan. 6, 2026

(54) COMPENSATION APPARATUS OF DISPLAY PANEL AND DISPLAY PANEL

(71) Applicant: YUNGU (GU'AN) TECHNOLOGY CO., LTD., Hebei (CN)

(72) Inventor: Ruikang Guo, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 788 days.

(21) Appl. No.: 17/684,525

(22) Filed: Mar. 2, 2022

(65) Prior Publication Data

US 2022/0187597 A1    Jun. 16, 2022

Related U.S. Application Data

(63) Continuation of application No. PCT/CN2021/078024, filed on Feb. 26, 2021.

(30) Foreign Application Priority Data

Apr. 23, 2020   (CN) .......................... 202010327953.4

(51) Int. Cl.
*G02B 27/00*     (2006.01)
*G02B 27/30*     (2006.01)

(52) U.S. Cl.
CPC ......... *G02B 27/0037* (2013.01); *G02B 27/30* (2013.01)

(58) Field of Classification Search
CPC .... G02B 27/00; G02B 27/0037; G02B 27/30; G02B 6/08; G02B 6/06; G02B 5/04;
(Continued)

(56) References Cited

U.S. PATENT DOCUMENTS

2016/0124252 A1* 5/2016 Kim ..................... G02F 1/1309
                                                           445/3
2018/0246259 A1*  8/2018 Du ............................ G02B 5/04

FOREIGN PATENT DOCUMENTS

CN        104409020 A      3/2015
CN        107731185 A      2/2018
(Continued)

OTHER PUBLICATIONS

International Search Report mailed on May 19, 2021, in corresponding to International Application No. PCT/CN2021/078024; 5 pages (with English Translation).

(Continued)

*Primary Examiner* — Jie Lei
(74) *Attorney, Agent, or Firm* — Maier & Maier, PLLC (57) ABSTRACT

A compensation apparatus of a display panel and a display panel. The compensation apparatus is used for performing optical compensation on a display panel to be compensated. The display panel to be compensated includes a bent region. The compensation apparatus of a display panel includes a light collimation module and an optical compensation module. The light collimation module is disposed on a light exiting side of the bent region and between the display panel to be compensated and the optical compensation module and is configured to adjust transmission directions of light beams constituting a first display image, so that the adjusted light beams are in parallel in pairs. The first display image is an image displayed in the bent region. The optical compensation module is configured to collect the first display image and perform optical compensation on the first display image.

18 Claims, 5 Drawing Sheets

(58) Field of Classification Search
CPC ..... G02B 3/08; G02B 2003/0093; G02F 1/13;
G02F 1/1333; G02F 1/1335; G02F
1/133526; G02F 1/133331; G02F
1/133504; G02F 1/133388; G02F
1/133524; G02F 1/1309; G09F 9/30;
G09F 9/301
USPC ......... 359/362, 207.7, 560, 564; 345/87, 84,
345/102
See application file for complete search history.

(56) References Cited

FOREIGN PATENT DOCUMENTS

| | | |
|---|---|---|
| CN | 109036244 A | 12/2018 |
| CN | 109949728 A | 6/2019 |
| CN | 110296998 A | 10/2019 |
| CN | 111369898 A | 7/2020 |
| WO | 2018089219 A1 | 5/2018 |

OTHER PUBLICATIONS

First Chinese Office Action issued Apr. 22, 2021, in corresponding to Chinese Application No. 202010327953.4; 19 pages (with Machine Translation).

The Second Office Action issued Oct. 22, 2021, in corresponding to Chinese Application No. 202010327953.4; 15 pages (with Machine Translation).

* cited by examiner

COMPENSATION APPARATUS OF DISPLAY PANEL AND DISPLAY PANEL

CROSS-REFERENCE TO RELATED APPLICATION

This is a continuation of International Patent Application No. PCT/CN2021/078024, filed on Feb. 26, 2021, which is based on and claims priority to a Chinese Patent Application No. CN 202010327953.4 filed on Apr. 23, 2020, disclosures of which are incorporated herein by reference in their entireties.

TECHNICAL FIELD

The present application relates to the field of display technologies and particularly, a compensation apparatus of a display panel and a display panel.

BACKGROUND

With the development of display technologies, a flexible display panel plays a more and more important role in the display industry such as mobile terminal devices. In order to stabilize the display effect, the display image of the display panel needs to be captured for pixel compensation before the display panel leaves the factory.

As for a display panel having a curved surface, shooting is generally performed by multiple cameras at multiple angles or performed by a single camera for multiple times. However, the scheme of shooting performed by multiple cameras at multiple angles incurs high costs, and the scheme of shooting performed by one camera for multiple times is complex to implement. As a result, the two schemes are both not conducive to mass production.

SUMMARY

The present application provides a compensation apparatus of a display panel and a display panel. The apparatus can perform optical compensation on a display panel having a curved surface. Additionally, the apparatus is simple in structure and easy to implement, thereby reducing the costs.

A compensation apparatus of a display panel is provided for optical compensation for a display panel to be compensated. The display panel to be compensated includes a bent region. The compensation apparatus for a display panel includes a light collimation module and an optical compensation module. The light collimation module is disposed on a light exiting side of the bent region and between the display panel to be compensated and the optical compensation module and is configured to adjust transmission directions of light beams constituting a first display image, so that the adjusted light beams are in parallel in pairs. The first display image is an image displayed in the bent region. The optical compensation module is configured to collect the first display image and perform optical compensation on the first display image.

A display panel is further provided. The display panel uses the compensation apparatus of a display panel having any one of the preceding characteristics to perform optical compensation. The present application provides a compensation apparatus of a display panel and a display panel. The compensation apparatus of a display panel is used for optical compensation for a display panel to be compensated. The display panel to be compensated includes a bent region. The compensation apparatus of a display panel includes a light collimation module and an optical compensation module. The light collimation module is disposed on a light exiting side of the bent region and between the display panel to be compensated and the optical compensation module and is configured to adjust the transmission directions of light beams constituting a first display image, so that the adjusted light beams are in parallel in pairs. The first display image is an image displayed in the bent region. The optical compensation module is configured to collect the first display image and perform optical compensation on the first display image. By configuring the light collimation module to be disposed between the display panel to be compensated and the optical compensation module, the light collimation module adjusts the transmission directions of light beams emitted from the bent region to make the adjusted light beams parallel in pairs so as to convert an image displayed in the bent region to a plane image. Thus, the optical compensation module needs only one shooting to collect a complete image to perform optical compensation. The apparatus is simple in structure and easy to implement. The apparatus avoids the need to configure multiple cameras or a complex motion mechanism, thereby reducing the costs and being conducive to mass production and popularization.

DETAILED DESCRIPTION

The present application is described hereinafter in conjunction with drawings and embodiments. The embodiments described herein are intended to explain and not to limit the present application. For ease of description, only part, not all, of structures related to the present application are illustrated in the drawings.

When an embodiment may be implemented differently, the process sequence may be different from the described sequence. For example, two continuously described processes may be performed at basically the same time or in a sequence opposite to the described sequence. An organic light-emitting diode (OLED) display panel as a current-mode light-emitting device has been increasingly applied in high-performance display. However, the OLED display panel always has problems of brightness uniformity and residual image. The compensation method may be also used in addition to the improvement to the structure of the display panel in a manufacturing process.

The compensation method may be divided into internal compensation and external compensation. The internal compensation refers to such a compensation method using a sub-circuit constructed by a thin film transistor (TFT) inside the pixel. The external compensation refers to that compensation is performed after the electrical or optical characteristics of the pixel are sensed through an external driving circuit or device.

The external compensation may also be divided into optical extraction mode and electrical extraction mode according to the difference of data extraction method. The optical extraction mode refers to extracting a brightness signal through an optical charge-coupled device (CCD) photography method after the backplane is lit. The electrical extraction mode refers to extracting electrical signals of TFT and OLED through an induction circuit of a driving chip. The types of signals extracted by the two modes are different, so are the data processing modes. The optical extraction mode is widely used at the current stage because of the simple structure and flexible method, which is usually called De-Mura.

As for a display panel having a curved surface, when the optical extraction mode is used for performing external compensation, generally shooting is performed by multiple cameras at multiple angles or one camera for multiple times. However, the scheme of shooting performed by multiple cameras at multiple angles incurs high costs, and the scheme of shooting performed by one camera for multiple times is complex to implement. As a result, the two schemes are both not conducive to mass production. Embodiments of the present application provide a compensation apparatus of a display panel and a display panel. The apparatus can perform optical compensation on a display panel having a curved surface and is simple in structure and easy to implement, thereby reducing the cost.

Figure 1:
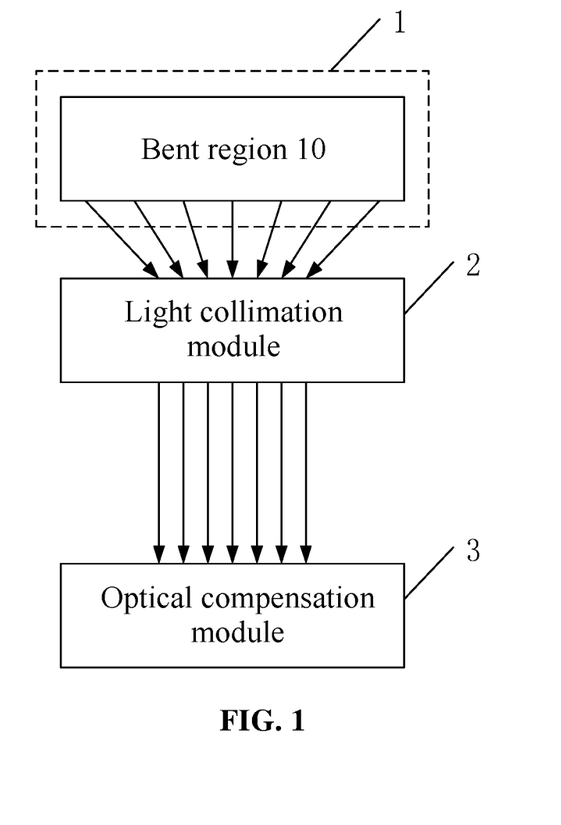
FIG. 1 is a diagram illustrating the structure of a compensation apparatus of a display panel according to embodiments of the present application.

The compensation apparatus of a display panel and the effect thereof are described below. FIG. 1 is a diagram illustrating the structure of a compensation apparatus of a display panel according to embodiments of the present application. As shown in FIG. 1, the compensation apparatus of the display panel is used for performing optical compensation on a display panel 1 to be compensated. The display panel 1 to be compensated includes a bent region 10. The compensation apparatus of a display panel includes a light collimation module 2 and an optical compensation module 3.

The light collimation module 2 is disposed on a light exiting side of the bent region 10 and between the display panel 1 to be compensated and the optical compensation module 3 and is configured to adjust the transmission directions of light beams constituting a first display image, so that the adjusted light beams are in parallel in pairs. The first display image is an image displayed in the bent region 10. The optical compensation module 3 is configured to collect the first display image and perform optical compensation on the first display image.

Figure 2:
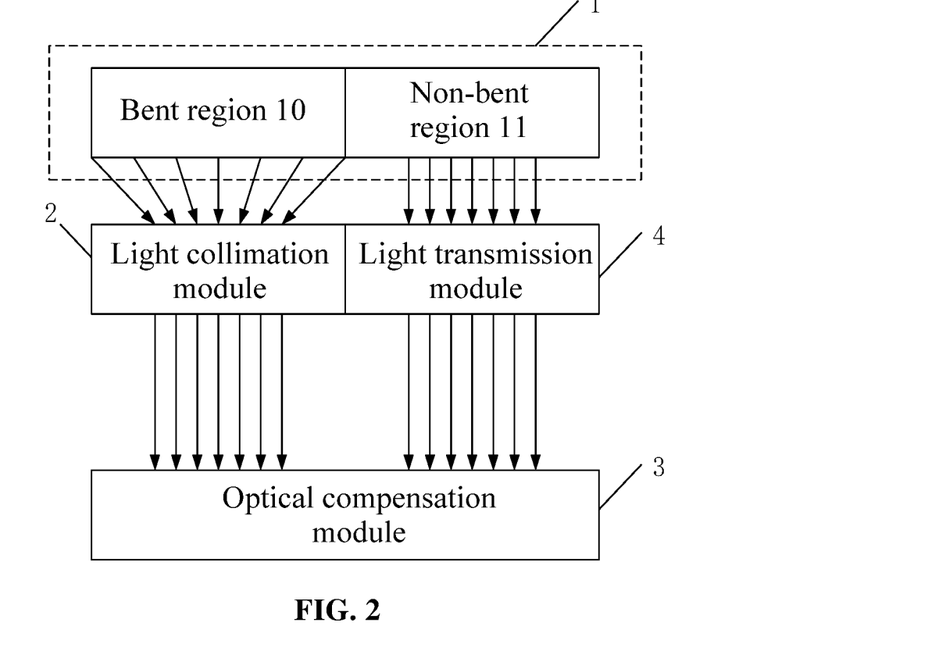
FIG. 2 is a diagram illustrating the structure of another compensation apparatus of a display panel according to embodiments of the present application.

FIG. 2 is a diagram illustrating the structure of another compensation apparatus of a display panel according to embodiments of the present application. Different from FIG. 1, the display panel 1 to be compensated further includes a non-bent region 11 disposed adjacent to the bent region 10. Correspondingly, the compensation apparatus of a display panel further includes a light transmission module 4.

The light transmission module 4 is disposed on a light exiting side of the non-bent region 11 and between the display panel 1 to be compensated and the optical compensation module 3 and is configured to transmit the light beams constituting a second display image. The second display image is an image displayed in the non-bent region 11. The optical compensation module 3 is further configured to collect the second display image and perform optical compensation on the second display image.

The light beams adjusted by the light collimation module 2 are parallel to the light beams transmitted by the light transmission module 4.

Optionally, the light collimation module 2 is a concave lens when the bent region 10 is bent towards the light collimation module 2.

The light collimation module 2 is a convex lens when the bent region 10 is bent away from the light collimation module 2.

Figure 3:
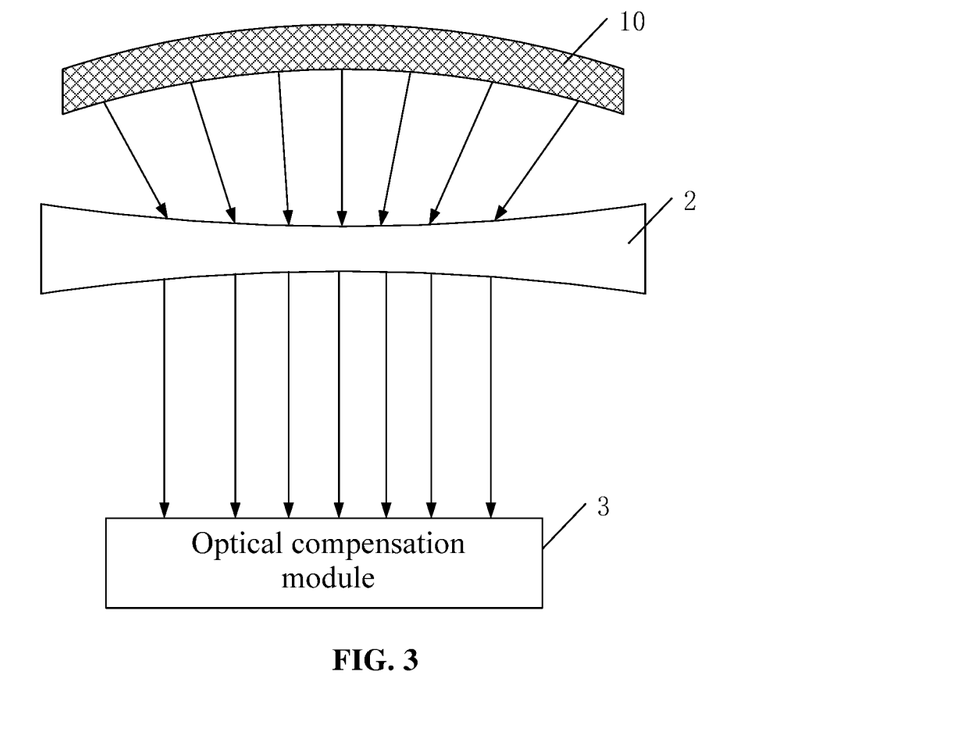
FIG. 3 is a diagram illustrating the working principle of a compensation apparatus of a display panel according to embodiments of the present application.

In one embodiment, FIG. 3 is a diagram illustrating the working principle of a compensation apparatus of the display panel according to embodiments of the present application. As shown in FIG. 3, the display panel 1 to be compensated is in an overall bent status, that is, the display panel 1 to be compensated includes only one bent region 10, and the bent region 10 is bent towards the light collimation module 2. At this time, the transmission directions of light beams constituting the first display image are in a gradual convergence status. Therefore, a concave lens may be selected as the light collimation module 2. The light beams that gradually converge are refracted by the concave lens to make the adjusted light beams parallel in pairs so that the first display image displayed in the bent region 10 is converted from a non-plane image to a plane image. In this manner, the optical compensation module 3 needs only one shooting before the optical compensation is performed.

In practice, the bent radii of bent regions 10 of different display panels 1 to be compensated may be different. Therefore, in order to ensure that the adjusted light beams are parallel in pairs, appropriate curvatures of concave lenses need to be selected according to the bent radii of the bent regions 10. Usually, the bent radius of the bent region 10 is proportional to the curvature of the light collimation module 2. That is, the larger the bent radius of the bent region 10, the larger the curvature of the concave lens, and the smaller the bent radius of the bent region 10, the smaller the curvature of the concave lens.

Figure 4:
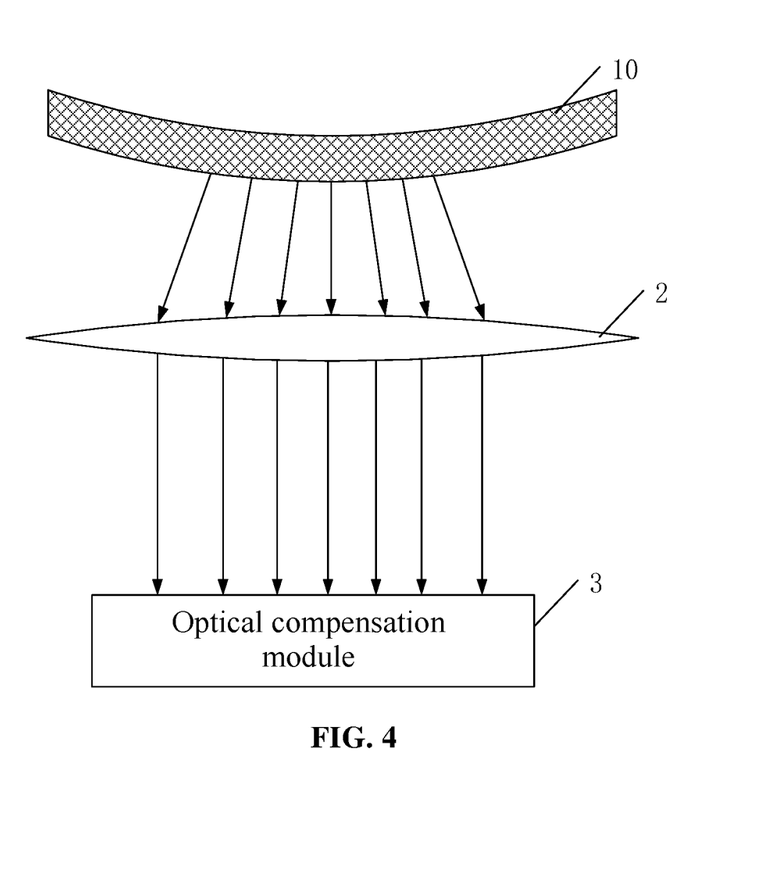
FIG. 4 is a diagram illustrating the working principle of another compensation apparatus of a display panel according to embodiments of the present application.

In one embodiment, FIG. 4 is a diagram illustrating the working principle of another compensation apparatus of a display panel according to embodiments of the present application. As shown in FIG. 4, the display panel 1 to be compensated is in an overall bent status, that is, the display panel 1 to be compensated includes only one bent region 10, and the bent region 10 is bent away from the light collimation module 2. At this time, the transmission directions of light beams constituting the first display image are in a gradual divergence status. Therefore, a convex lens may be selected as the light collimation module 2. The light beams that gradually diverge are refracted by the convex lens to make the adjusted light beams in parallel in pairs so that the first display image displayed in the bent region 10 is converted from a non-plane image to a plane image. In this manner, the optical compensation module 3 needs only one shooting before optical compensation is performed.

In practice, the bent radii of bent regions 10 of different display panels 1 to be compensated may be different. Therefore, in order to ensure that the adjusted light beams are parallel in pairs, appropriate curvatures of convex lenses need to be selected according to the bent radii of the bent regions 10. Usually, the bent radius of the bent region 10 is proportional to the curvature of the light collimation module 2. That is, the larger the bent radius of the bent region 10, the larger the curvature of the convex lens, and the smaller the bent radius of the bent region 10, the smaller the curvature of the convex lens.

Additionally, as for the structures shown in FIGS. 3 and 4, the area of the light collimation module 2 may be greater than or equal to the area of the bent region 10 to ensure that the light beams emitted from the bent region 10 are all adjusted.

Optionally, the light transmission module 4 is a horizontal perspective lens. In one embodiment, FIG. 5 is a diagram illustrating the working principle of another compensation apparatus of a display panel according to embodiments of the present application.

Figure 5:
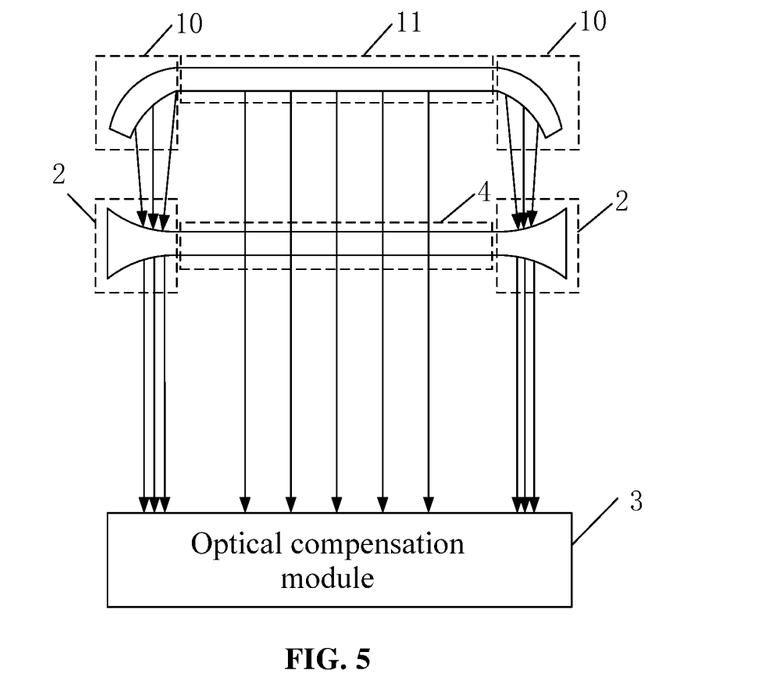
FIG. 5 is a diagram illustrating the working principle of another compensation apparatus of a display panel according to embodiments of the present application.

As shown in FIG. 5, the display panel 1 to be compensated is a display panel having double curved surfaces, that is, the display panel 1 to be compensated is includes two bent regions 10 and one non-bent region 11. Both sides of the non-bent region 11 are connected to the two bent regions 10, and the bent regions 10 are bent towards the light collimation module 2. At this time, the transmission directions of light beams constituting the first display image are in a gradual convergence status, and the transmission directions of light beams constituting the second display image are in parallel in pairs. Therefore, a concave lens may be selected as the light collimation module 2, and the light beams that gradually converge are refracted by the concave lens to make the adjusted light beams in parallel in pairs so that the first display image displayed in the bent region 10 is converted from a non-plane image to a plane image. At this same time, the light transmission module 4 chooses a horizontal perspective lens having a uniform thickness and a high transmittance, so that the optical path of the second display image displayed in the non-bent region 11 maintains unchanged. The light beams adjusted by the concave lens are in parallel to the light beams transmitted by the horizontal perspective lens. In this manner, the optical compensation module 3 needs only one shooting before optical compensation is performed.

In practice, the bent radii of bent regions 10 of different display panels 1 to be compensated may be different. Therefore, in order to ensure that the adjusted light beams are parallel in pairs, appropriate curvatures of concave lenses need to be selected according to the bent radii of the bent regions 10. Usually, the bent radius of the bent region 10 is proportional to the curvature of the light collimation module 2. That is, the larger the bent radius of the bent region 10, the larger the curvature of the concave lens, and the smaller the bent radius of the bent region 10, the smaller the curvature of the concave lens.

Figure 6:
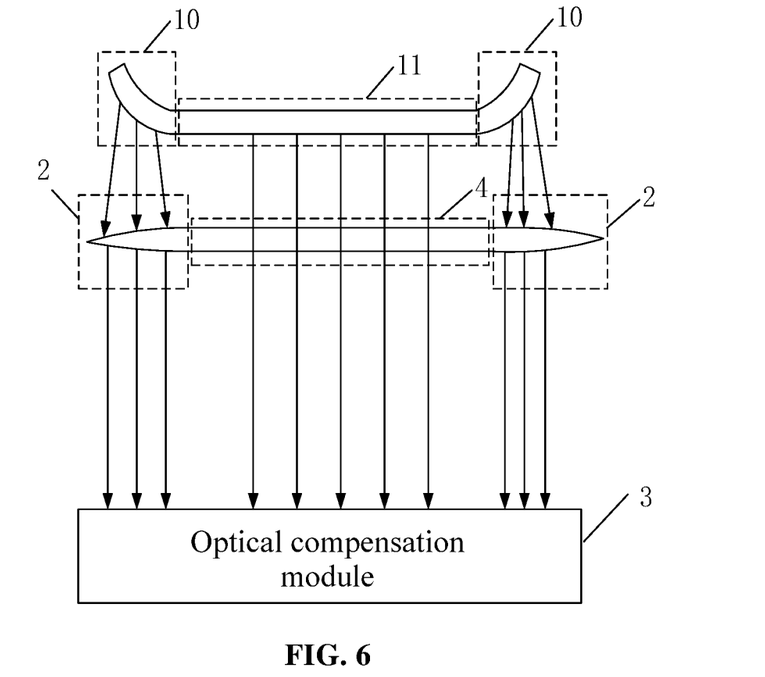
FIG. 6 is a diagram illustrating the working principle of another compensation apparatus of a display panel according to embodiments of the present application.

In one embodiment, FIG. 6 is a diagram illustrating the working principle of another compensation apparatus of a display panel according to embodiments of the present application.

As shown in FIG. 6, the display panel 1 to be compensated is a display panel having double curved surfaces, that is, the display panel 1 to be compensated is includes two bent regions 10 and one non-bent region 11. Both sides of the non-bent region 11 are connected to the two bent regions 10, and the bent regions 10 are bent away from the light collimation module 2. At this time, the transmission directions of light beams constituting the first display image are in a gradual divergence status, and the transmission directions of light beams constituting the second display image are in parallel in pairs. Therefore, a convex lens may be selected as the light collimation module 2, and the light beams that gradually diverge are refracted by the convex lens to make the adjusted light beams in parallel in pairs so that the first display image displayed in the bent region 10 is converted from a non-plane image to a plane image. At the same time, the light transmission module 4 chooses a horizontal perspective lens having a uniform thickness and a high transmittance, so that the optical path of the second display image displayed in the non-bent region 11 maintains unchanged. The light beams adjusted by the convex lens are parallel to the light beams transmitted by the horizontal perspective lens. In this manner, the optical compensation module 3 needs only one shooting before optical compensation is performed.

In practice, the bent radii of bent regions 10 of different display panels 1 to be compensated may be different. Therefore, in order to ensure that the adjusted light beams are in parallel in pairs, appropriate curvatures of convex lenses need to be selected according to the bent radii of the bent regions 10. Usually, the bent radius of the bent region 10 is proportional to the curvature of the light collimation module 2. That is, the larger the bent radius of the bent region 10, the larger the curvature of the convex lens, and the smaller the bent radius of the bent region 10, the smaller the curvature of the convex lens.

Additionally, as for the structures shown in FIGS. 5 and 6, the area of the light collimation module 2 may be greater than or equal to the area of the bent region 10 to ensure that the light beams emitted from the bent region 10 are all adjusted. The area of the light transmission module 4 may be equal to the area of the non-bent region 11 to ensure that the light beams emitted from the non-bent region 11 are all transmitted by the light transmission module 4.

Optionally, the light collimation module 2 and the light transmission module 4 may be an integrally formed device. In this manner, no gap is left between the light collimation module 2 and the light transmission module 4 to ensure that all the light beams of the display panel 1 to be compensated are collected.

The scheme provided by the present application is applicable to not only the preceding display panel having double curved surfaces, but also a display panel having four curved surfaces or multiple curved surfaces. This is not limited in the present embodiment.

Still referring to FIGS. 1 to 6, the light beams adjusted by the light collimation module 2 have a same density in per unit area. The more uniform the distribution of the light beams adjusted by the light collimation module 2, the more similar the first display image collected by the optical compensation module 3 to a plane image, so the more conducive for the optical compensation module 3 to compensate for the image.

Optionally, the difference between the density of the light beams adjusted by the light collimation module 2 per unit area and the density of the light beams transmitted by the light transmission module 4 per unit area is less than or equal to a preset threshold.

Referring to FIG. 2 and FIGS. 5 and 6, by selecting an appropriate light collimation module 2, the light beams adjusted by the light collimation module 2 have the same density in per unit area, thereby ensuring the compensation effect of the optical compensation module 3 to the image. Due to the light transmission module 4, the light beams transmitted by the light transmission module 4 do not change the transmission path of light, so that the light beams adjusted by the light transmission module 4 have the same density in per unit area and have a same density in per unit area as the light beams emitted from the non-bent region.

The difference between the density of the light beams adjusted by the light collimation module 2 per unit area and the density of the light beams transmitted by the light transmission module 4 per unit area is less than or equal to the preset threshold. The smaller the difference between the density of the light beams adjusted by the light collimation module 2 per unit area and the density of the light beams transmitted by the light transmission module 4 per unit area, the more similar the light beams adjusted by the light collimation module 2 to the light beams emitted from the non-bent region 11 (that is a plane), so the more conducive for the optical compensation module 3 to compensate for the image.

The value of the preset threshold may be designed according to actual needs and is not limited in the present embodiment.

Figure 7:
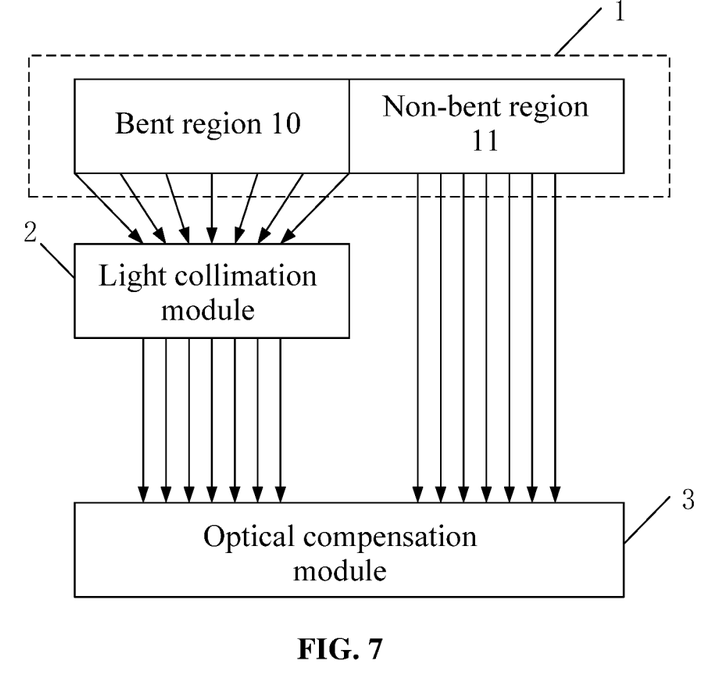
FIG. 7 is a diagram illustrating the structure of another compensation apparatus of a display panel according to embodiments of the present application.

Optionally, FIG. 7 is a diagram illustrating the structure of another compensation apparatus of a display panel according to embodiments of the present application. Different from FIG. 2, the display panel 1 to be compensated includes the non-bent region 11 adjacent to the bent region 10, but the compensation apparatus of a display pane does not need to include the light transmission module. That is, the light beams constituting the second display image may be directly collected by the optical compensation module 3. The second display image is an image displayed in the non-bent region 11.

The light beams adjusted by the light collimation module 2 are parallel to the light beams constituting the second display image.

The optical compensation module 3 includes a CCD camera, which acquires the brightness of a current image according to a collected image. The optical compensation module 3 may further include other compensation devices, which calculate the compensation value according to the brightness difference and input the compensation value into a chip to perform display compensation on the display panel. The optical compensation module 3 may further be other type cameras. This is not limited in the present embodiment.

Optionally, the optical compensation module 3 is further configured to splice the first display image and the second display image into a whole display image of the display panel to be compensated.

The optical compensation module 3 is further configured to: splice the first display image and the second display image into a whole display image of the display panel to be compensated, acquire the brightness of the current image according to the collected image, calculate the compensation value according to the bright difference, and input the compensation value into a chip to perform display compensation on the display panel.

The bent region 10 and the non-bent region 11 may have a common display region, and the first display image and the second display image captured by the optical compensation module 3 may have an overlapping portion, so the overlapping portion of the first display image and the second display image needs to be cut. Optionally, two points may be configured on the display image of the display panel 1 to be compensated as the cutting mark points. The cutting mark points are recognized in the first display image and the second display image as the image cutting-splicing mark points to enable the image to be spliced accurately. The cutting mark points may be disposed at a position corresponding to the junction of the first display image and the second display panel in the display image, or may be disposed at other positions according to needs, as long as the overlapping portion of the first display image and the second display image can be recognized according to the cutting mark points. This is not limited in the present embodiment.

The present application provides a compensation apparatus of a display panel for performing optical compensation on a display panel to be compensated. The display panel to be compensated includes a bent region. The compensation apparatus of a display panel includes a light collimation module and an optical compensation module. The light collimation module is disposed on a light exiting side of the bent region and between the display panel to be compensated and the optical compensation module and is configured to adjust the transmission directions of light beams constituting a first display image, so that the adjusted light beams are in parallel in pairs. The first display image is an image displayed in the bent region. The optical compensation module is configured to collect the first display image and perform optical compensation on the first display image. By configuring the light collimation module between the display panel to be compensated and the optical compensation module, the light collimation module is configured to adjust the transmission directions of light beams emitted from the bent region to make the adjusted light beams in parallel in pairs so as to convert an image displayed in the bent region to a plane image. Thus, the optical compensation module needs only one shooting to collect a complete image to perform optical compensation. The apparatus is simple in structure and easy to implement. The apparatus avoids the need to configure multiple cameras and a complex motion mechanism, thereby reducing the costs and being conducive to mass production and popularization.

Embodiments of the present application further provide a display panel that is the display panel to be compensated mentioned in the preceding embodiments. The display panel uses the compensation apparatus of a display panel described in the preceding embodiments to perform optical compensation. The display panel to be compensated may be a display panel having a fixed curved surface or a display panel having a non-fixed curved surface. The display panel may be typed as any one of an OLED display panel, an in-plane switching (IPS) display panel, a twisted nematic (TN) display panel, a vertical alignment (VA) display panel, electronic paper, a quantum dot light-emitting diodes (QLED) display panel or a micro light-emitting diode (μLED) display panel. This is not limited in the present application.

What is claimed is:

1. A compensation apparatus, wherein the compensation apparatus is configured for a display panel to be compensated, the display panel comprising:
   at least one bent region;
   a non-bent region adjacent to the at least one bent region;
   the compensation apparatus comprising:
   a light transmission module disposed on a light exiting side of the non-bent region between a display panel to be compensated and an optical compensation module;
   a light collimation module disposed on a light exiting side of the at least one bent region between the display panel to be compensated and the optical compensation module, and configured to:
   adjust transmission directions of light beams constituting a first display image, wherein the adjusted light beans are in parallel in pairs, the first display image is an image displayed in the at least one bent region and the adjusted light beams have a same density per unit area as light beams emitted from the non-bent region; and an optical compensation module configured to:
collect the first display image and
perform optical compensation on the first display image.

2. The compensation apparatus of the display panel according to claim 1, wherein the light transmission module is configured to:
transmit light beams constituting a second display image, wherein the second display image is an image displayed in the non-bent region, and the optical compensation module is further configured to:
collect the second display image and
perform optical compensation on the second display image, and the light beams adjusted by the light collimation module are parallel to the light beams transmitted by the light transmission module.

3. The compensation apparatus of the display panel according to claim 2, wherein the light transmission module is a horizontal perspective lens.

4. The compensation apparatus of the display panel according to claim 3, wherein the horizontal perspective lens has a uniform thickness and a transmittance to make an optical path of the second display image displayed in the non-bent region maintains unchanged.

5. The compensation apparatus of the display panel according to claim 2, wherein the optical compensation module is further configured to:
splice the first display image and the second display image into a whole display image of the display panel to be compensated,
acquire brightness of the whole display image according to a plurality of collected images,
calculate a compensation value according to a brightness difference, and
input the compensation value into a chip to perform display compensation on the display panel, wherein the plurality of collected images comprises the first display image and the second display image.

6. The compensation apparatus of the display panel according to claim 2, wherein two cutting mark points are configured in a display image of the display panel when the at least one bent region and the non-bent region have a common display region, the first display image collected by the optical compensation module and the second display image collected by the optical compensation module have an overlapping portion, and the two cutting mark points are configured as image cutting-splicing mark points for splicing the first display image and the second display image.

7. The compensation apparatus of the display panel according to claim 2, wherein the light collimation module and the light transmission module are formed in an integrated device.

8. The compensation apparatus of a display panel according to claim 2, wherein an area of the light transmission module is equal to an area of the non-bent region.

9. The compensation apparatus of the display panel according to claim 1, wherein the light collimation module is either a concave lens when the at least one bent region is bent toward the light collimation module; or
a convex lens when the at least one bent region is bent away from the light collimation module.

10. The compensation apparatus of the display panel according to claim 9, wherein a bent radius of the at least one bent region is proportional to a curvature of the light collimation module.

11. The compensation apparatus of the display panel according to claim 1, wherein the display panel to be compensated comprises two bent regions, the non-bent region is configured between the two bent regions, both sides of the non-bent region are connected to the two bent regions, and the compensation apparatus of the display panel further comprises:
a light transmission module disposed on a light exiting side of the non-bent region and between the display panel to be compensated and the optical compensation module and configured to transmit light beams constituting a second display image, wherein the second display image is an image displayed in the non-bent region, and the optical compensation module is further configured to:
collect the second display image and
perform optical compensation on the second display image; and the light beams adjusted by the light collimation module are parallel to the light beams transmitted by the light transmission module.

12. The compensation apparatus of the display panel according to claim 11, wherein bent radii of the two bent regions are different from each other.

13. The compensation apparatus of the display panel according to claim 1, wherein
light beams constituting a second display image transmitted from the non-bent region are directly transmitted to the optical compensation module, and the second display image is an image displayed in the non-bent region, wherein the optical compensation module is further configured to:
collect the second display image and
perform optical compensation on the second display image; and the light beams adjusted by the light collimation module are parallel to the light beams constituting the second display image.

14. The compensation apparatus of the display panel according to claim 1, wherein a difference between the density of the adjusted light beams and a density of light beams transmitted by a light transmission module per unit area is less than or equal to a preset threshold.

15. The display panel according to claim 1, wherein the display panel has a curved surface.

16. The compensation apparatus of the display panel according to claim 1, the optical compensation module comprises a charge-coupled device camera.

17. The compensation apparatus of the display panel according to claim 1, wherein an area of the light collimation module is greater than or equal to an area of the at least one bent region.

18. A display panel using the compensation apparatus of the display panel according to claim 1 to perform optical compensation.

* * * * *